(No Model.)
J. T. CRAW.
THERMOMETER.
No. 530,928. Patented Dec. 18, 1894.
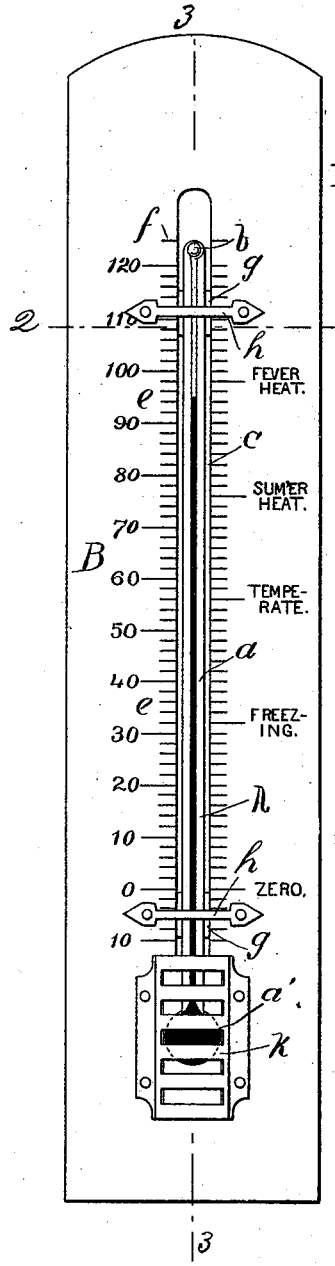
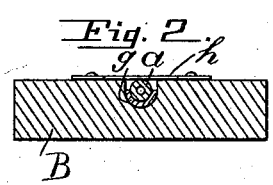
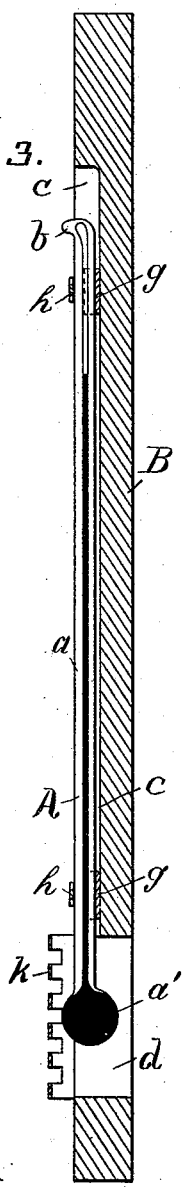
WITNESSES:
William G. Finley,
Arthur L. Keith
INVENTOR
Joseph T. Craw
BY
D. Walter Boone
ATTORNEY

UNITED STATES PATENT OFFICE.

JOSEPH T. CRAW, OF JERSEY CITY, NEW JERSEY, ASSIGNOR OF ONE-HALF TO BROWN & BAILEY, OF PHILADELPHIA, PENNSYLVANIA.

THERMOMETER.

SPECIFICATION forming part of Letters Patent No. 530,928, dated December 18, 1894.

Application filed August 19, 1892. Serial No. 443,517. (No model.)

*To all whom it may concern:*

Be it known that I, JOSEPH T. CRAW, a citizen of the United States, and a resident of Jersey City, in the county of Hudson and State of New Jersey, have invented certain new and useful Improvements in Thermometers and Barometers, of which the following is a specification.

My invention relates to improvements in thermometers and barometers, and it is the object of my invention to adapt the same to be readily adjusted for correcting the reading of the instrument by providing for longitudinal movement of the mercury tube.
Referring to the drawings, which accompany the specification, Figure 1 is an elevation of the face of the instrument, in this case a thermometer. Fig. 2 is a cross section on the line 2—2 of Fig. 1. Fig. 3 is a vertical section on the line 3—3 of Fig. 1. Fig. 4 is detail, showing how the clamps to hold the tube in any desired position as respects the scale are easily made.

A, is a thermometer with tube, $a$, and bulb, $a'$. The blown end, $b$, is bent out and at about right angles, so as to form a stop, as seen in Fig. 3, to limit the movement of the thermometer in one direction.

B, is the board, or bracket, on which the thermometer is set, and having a longitudinal groove, $c$, deep enough to allow the thermometer tube to be set in flush with the surface of the board.

$d$, is a slot for the bulb, $a'$.
On the face of the board, B, is the ordinary scale of temperatures, $e$, graduated accurately for the thermometer when the same is in one position, and on the board, B, may also be a line, $f$, a little below the top of the groove, $c$, and so positioned that when the extreme end of the tube is in line therewith, the reading will be correct. In the said groove, $c$, are glued one or more half tubes of rubber, $g$, made by dividing short sections of rubber tubing diametrically, (Fig. 4;) the bore of the rubber tubes being small enough to tightly clamp the tube, $a$, of the thermometer, A. Now the said thermometer tube, $a$, is placed in the groove, $c$, and the bulb, $a'$, in the slot, $d$, and so that both tube and bulb may have end play of about 10° of the scale, or more or less if so desired. Then bands, $h$, are screwed or riveted across the slot $d$, over the rubber half tubes, $g$, and a cage, $k$, of the usual kind is fixed on the board, B, over the bulb, $a'$. The thermometer is now in place, being clamped by the rubber tubes, $g$, $g$, so that it can not move without some force applied to it.

Evidently the instrument can be adjusted to correct readings by moving the mercury tube up or down according as the error is in too low or too high a reading.

Manifestly, if the thermometer were fixed on the board, B, and the scale were on a separate piece and made movable, the essential features of my invention would be equally well attained.

Now, having described my invention, I declare that what I claim, and desire to secure by Letters Patent, is—

1. The combination of the thermometer or barometer A, the board B grooved and slotted longitudinally a greater length than the length of said thermometer or barometer, clamps of elastic material fixed in the said groove and adapted to hold the thermometer or barometer A in the position to which the same is moved, substantially as described.

2. In combination with a board and scale a thermometer A, stop $b$, groove $c$, rubber clamps $g$, fixed in said groove $c$ and adapted to hold the thermometer A in the position to which said thermometer is moved, and devices for holding said thermometer on the board, substantially as described.

Signed at New York, in the county of New York and State of New York, this 15th day of August, A. D. 1892.

JOSEPH T. CRAW.

Witnesses:
ARTHUR L. KENT,
M. ELIZABETH FINLEY.